Sept. 10, 1946.  W. SLATER  2,407,519
INSERTED TOOTH TOOL
Filed Sept. 16, 1943  2 Sheets-Sheet 1
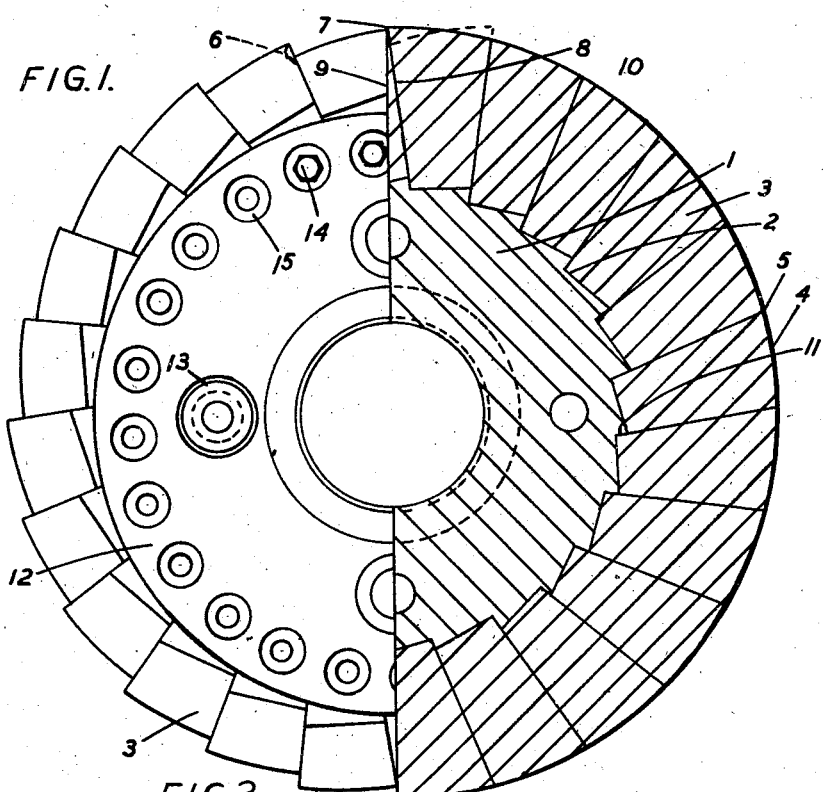
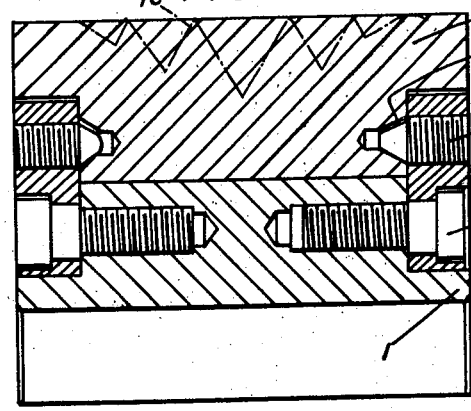
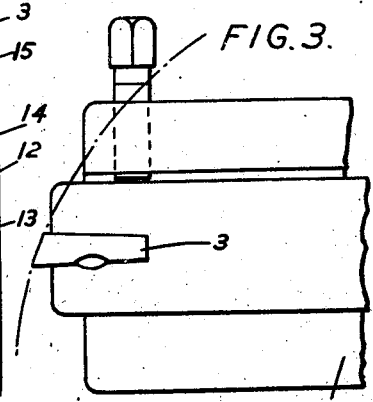
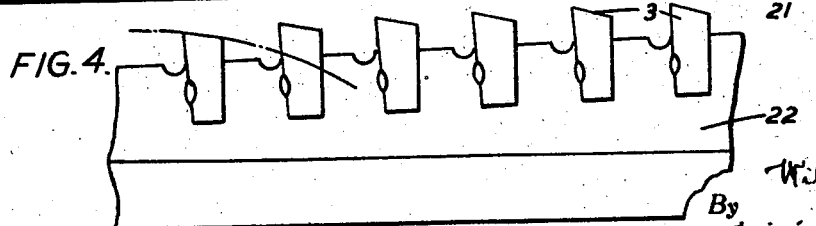
Inventor
Wilfred Slater
By
William ——
Attorney Sept. 10, 1946.   W. SLATER   2,407,519
INSERTED TOOTH TOOL
Filed Sept. 16, 1943   2 Sheets-Sheet 2

Inventor
Wilfred Slater
By
William Strauss
Attorney

Patented Sept. 10, 1946

2,407,519

UNITED STATES PATENT OFFICE 2,407,519

INSERTED TOOTH TOOL

Wilfred Slater, Quinton, Birmingham, England

Application September 16, 1943, Serial No. 502,685
In Great Britain March 1, 1943

4 Claims. (Cl. 29—105)

This invention relates to metal working tools such as hobs, broaches, taps, and the like, of the kind including a supporting body and a plurality of cutting elements mounted thereon.

The object of the invention is a process and/or means for forming or grinding cutting elements or teeth in a simple rapid manner which yields the desired form or allows it to be subsequently realised by a simple operation; which effects a considerable saving in labour and machine time; and which lengthens the effective working life of the elements and consequently the tool into which they are built.

Having the aforesaid and other objects in view as will appear in the following description, the invention consists in a body or holder for the cutting elements of inserted tooth tools which is so shaped and constructed that the peripheral surfaces of the elements when assembled on the body can be machined, ground, or similarly processed as segments of a common circle which when the elements are reassembled in working or cutting position, provide relief away from the cutting edge. In this way, a simple turning, grinding, or like operation which can be carried out on a standard kind of machine tool is substituted for the more numerous and complex operations previously needed.

Further features of the invention are more particularly described in the annexed specification and pointed out in the appended claims.

Reference may be had to the accompanying drawings in which

Figure 1 is an end view partly in section, partly in elevation of a tool according to the invention.

Figure 2 is a half sectional elevation at right angles to Figure 1.

Figures 3 and 4 illustrate other applications of cutting elements made in accordance with the invention.

Figure 5:
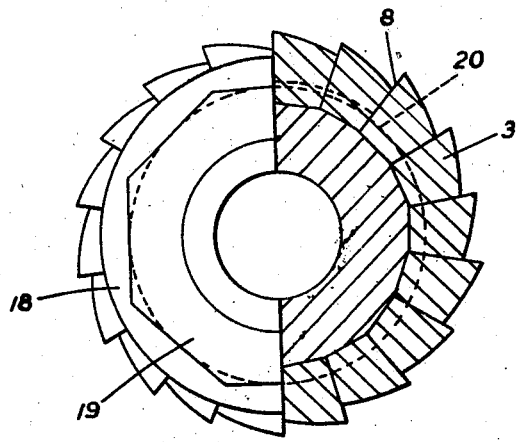
Figures 5 and 6 depict the improved cutting elements mounted in working position on a modified body.

In an embodiment of the invention shown in Figures 1 and 2, the body 1 is provided with a number of longitudinal seating surfaces or grooves 2 each of which is shaped and inclined or curved to suit the under face of a cutting element 3 (which said face is preferably flat) and tilt or hold the element so that its periphery 4 becomes a segment of a circle or is susceptible of taking such a curve when the body is rotated about its longitudinal axis and the peripheral surfaces of the several cutting elements are in contact with and are operated upon by a cutting tool, grinding wheel, or the like, as depicted in the right half of Figure 1. In this position and during such process, the rear edge 5 of each element is farther from the centre of the body than it is when placed in a cutting or working position such as shown in the left half of Figure 1 so that when reassembled in the working position for use as a cutter by reversal or displacement through 180°, the new position relative to or measured from the body centre provides the desired relief away from the cutting edge, the effect being to exchange the position of the front and rear edges. The dotted line at the top of Figure 1 shows the working position of a segment superposed on its making position.

Cutters manufactured in the manner described by collective fabrication can be reassembled in either of two ways; one, on a body of normal type preferably modified; the other, on the same body as is used for making the cutters. In the latter case, the leading face of the cutting element is tangential unless modified i. e. it has negative rake, but this can be ground to an angle which provides positive rake as indicated at 6 in Figure 1.

A suitable blank for cutting elements in initial manufacture consists of a length of four-sided bar with a flat base 2, two sides converging at an appropriate angle which is determined by the number of elements in say a rotary hob, or otherwise according to the particular application of the tool, and a flat or curved periphery which is operated upon as aforesaid and finishes as a segment of a circle.

In one arrangement of seat and element where the same body is used for making the elements and for manufacturing use, the floor or base of each seating groove 2 is at right angles to a radial line from the corner which leads when cutting, when said corner 7 is in position for making, the blank sides diverge isogenically, and the leading face 8 of the element makes an angle with the radial line 9 one-half of that included by the two sides 8, 10. The peripheral longitudinal grooves 2 are of sawtooth configuration the long limb of which constitutes the seat 2 and the short limb 11 of which defines the circumferential position of the relevant element. The several elements are adapted to be assembled in such a manner that each one abuts and is abutted by its neighbours so that they behave as a solid cutter. Any appropriate means may be adopted for gripping and holding the elements in situ on the body, and one such convenient means will now be described.

At each of the two ends of the body is situated a clamping plate 12 of disc shape inset into a recess partly in the insert element and partly in the body end, these being pressed home by screws, preferably countersunk. Such endwise and also a radial movement is transmitted to each element by the agency of inclined planes conveniently in the form of a cone-ended screw 14 in the disc and a complementarily-shaped cavity 15 in each end face of each element, the arrangement being such that the thrust from the screw ends is translated into resultants acting at an angle to the end faces. To ensure this action, a slight clearance (shown exaggerated) is provided in the cavities. By clamping the end plates in position, the elements are collectively and individually located and gripped so that they function as a solid body.

When the elements are displaced through an angle of 180° to bring them into cutting position, the rake or angle of the leading face is, as beforementioned, of a negative order which is appropriate for some metals; grinding of the faces to provide positive rake can be effected by conventional tools and methods preferably when the elements are disassembled, though they can be ground in situ.

As the cutting edges of the elements become worn, they can be sharpened and restored time after time by regrinding until they are almost worn away, since they are buttressed by the adjacent face of the proximate element which gives solid and adequate support; therein the improved elements differ from known cutters in which the members are separated by spaces. This continuity characteristic of tools according to the invention provides a smoother cutting action and assists in obtaining greater accuracy.

The contour of the periphery of the cutting elements is adaptable to the form required e. g. straight, formed (an example being indicated by dotted lines 16 Figure 2) threaded for thread milling, etc.

Figure 6:
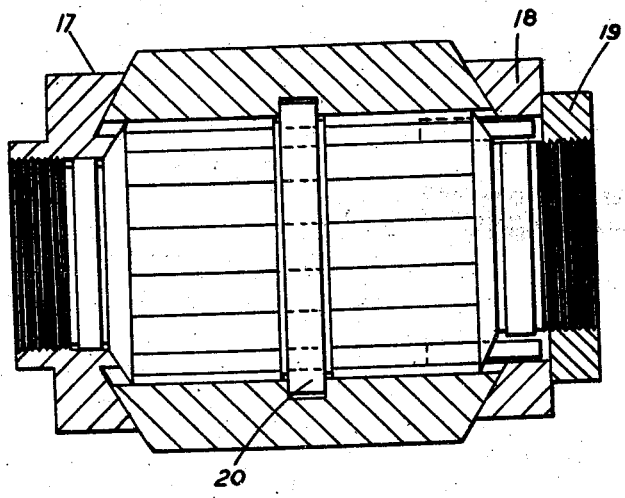

Cutting elements manufactured as described may, as adumbrated, be assembled on and used with a normal type body the periphery of which has a number of longitudinal flats which form seats for the bases of the cutters. Thus a body is illustrated in Figures 5 and 6 wherein the ends of the cutters are frustroconoidal in shape, to engage with similarly coned collars 17, 18 one of which is screwed on the end of the body and the other is pressed by a nut 19 at the other end. To improve location of the several cutters, I propose to add an upstanding ring 20 at or about the middle of the body and groove the underface of each insert to fit closely thereon. In this modification, the leading face 8 of the cutting elements is radial, as is a line drawn through the centre of each cutter.

Cutters made according to the invention are obviously capable of utilisation in diverse forms of tools in which a series of cutting elements is secured to a body, and also when a single tool is employed. Figure 3 shows a cutting element 3 fixed in the tool post 21 of, say, a lathe, while Figure 4 illustrates a broach the body 22 of which carries in series several cutters. Other applications will be self-evident.

Having thus described my invention, what I claim is:

1. Means for supporting independent tooth tools comprising a circular body formed for supporting independent tooth tools for simultaneous shaping into cutting elements and subsequently supporting said cutting elements in cutting position, said body being peripherally formed with immediately successive recesses to present flat seats and tooth tools having flat bases to seat in said recesses and bear throughout on the flat seats, the extended lengths of the tools beyond the recesses being in relatively mutual contact throughout the circumferential length of the body to present the free ends of the tools remote from the body as relatively rigid segments of a common circle to permit desired shaping of the ends of the tools in a single operation under rotation of the body, the formation of the seats, the cooperating ends of the tools and of the tools beyond the seats providing for a movement of the formed tools throughout 180° to arrange the tools in cutting position on the body with the tools having a substantially identical cooperation with the seats and with each other beyond the seats in the cutting position as in the forming position.

2. Means for supporting independent tooth tools comprising a body peripherally formed with recesses having flat seats and tooth tools to cooperate with the seats, each of the tools having sides converging toward the seats and a flat end to engage the flat seat of a recess with such flat end, the converging sides of the tools being in mutual contact beyond the seats in all positions of the tools relative to the body, the tools having two relatively reversed positions with respect to the body, one to dispose the tools for making the cutters and the other to dispose the tools as cutting elements with respect to the body, the tools in either position having a flat bearing on the flat surfaces of the recesses and a mutual contact beyond the flat surfaces throughout the peripheral length of the body.

3. A construction as defined in claim 2 wherein in either position of the tools relative to the body, the tools extend beyond the body in mutual contact to define a continuous ring of metal composed solely of the cutters in either of said positions, whereby to establish a regiditive position, a continuity of function and an extreme accuracy in operation.

4. Means for supporting independent tooth tools comprising a body peripherally formed with recesses having flat seats and tooth tools to cooperate with the seats, each of the tools having sides converging toward the seats and a flat end to engage the flat seat of a recess with such flat end, the converging sides of the tools being in mutual contact beyond the seats throughout the circumferential length of the body to present the free ends of the tools remote from the body as relatively rigid segments of a common circle to permit the desired shaping of the ends of the tools in a single operation under rotation of the body, and means for supporting the shaped tools comprising an independent body peripherally formed with flat seats to cooperate with the formed tools, the sides of the tools converging towards the seats and the flat ends of the tools engaging the flat seats with such flat ends presenting an equal angle to each of the converging sides of the tools, the converging sides of the tools being in mutual contact beyond the seats throughout the peripheral length of such independent body.

WILFRED SLATER.